United States Patent
Trip et al.

(10) Patent No.: US 7,616,760 B2
(45) Date of Patent: Nov. 10, 2009

(54) HEADSET FOR USE WITH A COMMUNICATION AND/OR MULTIMEDIA DEVICE

(75) Inventors: Barteld Trip, Emmen (NL); Tjapko Uildriks, Anderen (NL); Erwin Weinans, Klijndik (NL)

(73) Assignee: Sony Ericsson Mobile Communications AB, Lund (SE)

( * ) Notice: Subject to any disclaimer, the term of this patent is extended or adjusted under 35 U.S.C. 154(b) by 587 days.

(21) Appl. No.: 11/278,682

(22) Filed: Apr. 5, 2006

(65) Prior Publication Data

US 2007/0263879 A1   Nov. 15, 2007

(51) Int. Cl.
*H04M 1/00* (2006.01)
*H04M 9/00* (2006.01)
*H04R 25/00* (2006.01)
(52) U.S. Cl. ........................... 379/430; 381/370
(58) Field of Classification Search ............. 379/430; 381/370, 384; 455/556.1, 569.1, 3.06
See application file for complete search history.

(56) References Cited

U.S. PATENT DOCUMENTS

2003/0073460 A1    4/2003   Van Pelt et al.

*Primary Examiner*—Tuan D Nguyen
(74) *Attorney, Agent, or Firm*—Renner, Otto, Boisselle & Sklar, LLP

(57) ABSTRACT

A headset is proposed for use with a communication and/or multimedia device, said headset comprising an interface for receiving input data, a processing unit for processing said input data to generate audio output signals, a speaker for outputting said audio output signals in a mono mode and connecting means for connecting the headset to a power supply in order to charge a battery or an accumulator being provided within said headset. Said connecting means are also connectable to an additional speaker device forming alone or together with said speaker of said headset a stereo headphone wherein said processing unit processes the input data to generate stereo output signals when said speaker device is connected to said headset.

31 Claims, 1 Drawing Sheet

HEADSET FOR USE WITH A COMMUNICATION AND/OR MULTIMEDIA DEVICE

TECHNICAL FIELD OF THE INVENTION

The present invention relates to a headset which is used in connection with a communication and/or multimedia device as well as to a combination consisting of a headset and an additional speaker device. Furthermore, the present invention also relates to a communication and/or multimedia device comprising a headset.

DESCRIPTION OF RELATED ART

Headsets or headphones are commonly used in connection with communication and/or multimedia devices in order to listen to audio signals produced by or transferred from these devices. Examples of such communication and/or multimedia devices are radio receivers, portable music players like CD players and MP3 players as well as mobile phones. The most recent generation of these headsets is represented by so-called on-ear Bluetooth voice headsets which have become more and more popular in the past. The reason is that these on-ear headsets provide a very convenient way in order to wear the headset for a hands-free communication.

A typical on-ear voice headset that is intended for use with a mobile phone is shown in FIG. 1. The headset 101 comprises a main body 102 which is connected to an arcuate mounting element 103 which allows to clamp the headset 101 to the ear of a user. In order to allow a two-way communication between the user of the headset 101 and another person via a base station, i.e., the mobile phone, the headset further comprises a speaker 104 being located in the rear part of the main body 102 as well as a microphone 105 which is provided at the front portion of the main body 102.

During operation, the headset 101 establishes a wireless communication link via an interface 106 with the base station, i.e., the mobile phone, in order to exchange digital communication data. Preferably, said interface 106 is realised in the form of a Bluetooth interface. Data transmitted from the phone and received by said interface 106 are processed further by a processing unit 107 being also located within the main body 102 which processes said data in order to generate audio output signals. Said output signals are then transferred to the speaker 104 in order to output the audio signals. Further, audio signals obtained by the microphone 105 are processed by the processing unit 107 and forwarded to the interface 106 in order to transmit said data to the phone. In this way, a two-way communication is realised, i.e., the user of the headphone 101 is able to listen to audio signals received from the mobile phone and to forward audio signals to said phone.

In order to allow a wireless operation, the headset 101 further comprises an internal power supply being represented by a battery 108 or an accumulator. Since this battery 108 or accumulator has to be recharged regularly, connecting means 109 are provided which can be used to connect the headset 101 to an external power supply in the form of a docking station.

Headsets as shown in FIG. 1 are commonly used in connection with a mobile phone since they allow a hands-free use. Thus, if a user of said phone receives a call, he does not have to reach the mobile phone in order to establish the communication link. In particular, his hands are free during the call and can be used for other things like taking notes or the like.

Besides the basic functionality of allowing telephone conversation, mobile phones nowadays often present additional multimedia applications to a user. One multimedia application which has become extremely popular recently is the possibility to use mobile phones as portable music players. Since the internal storage capacity of mobile phones has been considerably increased in the past, it is now possible to store audio data for example as MP3 data and to reproduce them in order to generate audio signals. In this way, a user can use his mobile phone also to listening to music.

The headset according to the prior art and as shown in FIG. 1 is, however, unsuitable for use with an MP3 multimedia application. The reason is that the headset has only a single speaker and is therefore only able to reproduce mono audio signals. The quality of this mono signals, however, is obviously not good enough for listening to music.

SUMMARY

Accordingly, it is an object of the present invention to provide a new solution for a headset which can be used in connection with a communication and/or multimedia device and which allows to listen to audio signals either in a mono mode, which is sufficient for telephone communication, or in a stereo mode, which is desired for listening to music.

In accordance with the present invention, a headset is proposed for use with a communication and/or multimedia device, said headset comprising an interface for receiving input data, a processing unit for processing said input data to generate audio output signals, a speaker for outputting said audio output signals in a mono mode and connecting means for connecting the headset to a power supply in order to charge a battery or an accumulator being provided within said headset. Said connecting means are also connectable to an additional speaker device forming alone or together with said speaker of said headset a stereo headphone wherein said processing unit processes the input data to generate stereo output signals when said speaker device is connected to said headset.

Accordingly, the present invention is based on the idea of allowing a headset to be connected with an additional speaker device which speaker device alone or in connection with said first speaker of the headset forms a stereo headphone. Based on the application of the multimedia/communication device the user of the device intends to use, the headset can now be used in order to reproduce mono audio signals or stereo audio signals. Instead of replacing the headphone by a new apparatus being able to produce stereo signals, the headset can now be connected to an additional accessory device which allows to listen to high quality, i.e., stereo audio signals.

An advantage of the present invention is that the additional speaker device which is used in order to build the stereo headphone can be formed as a relatively simple device. The reason is that the stereo headphone makes use of the internal resources of the headset, in particular of the interface used to exchange data with the basis, e. g., the mobile phone, as well as of the processing unit used for processing the input data received from the mobile phone in order to generate the audio output signals. Thus, starting from the original headset which is only able to produce mono audio signals, a high quality stereo headphone can be obtained in a very easy and cheap way.

Another advantage of the present invention is that no additional connecting means are required in order to connect the additional speaker device to the headset since the already available connecting means which are used to charge the internal power supply of the headset are used. In this way, the present invention differs from a solution disclosed in US 2003/0073460 A1 which discloses a modular headset comprising a first unit that has first and second operational modes wherein the first unit is in a second mode connected to a second unit which has processing power on board for generating stereo audio. In this known solution, an additional connector is necessary in order to connect both units to form the stereo headphone. Further, the second unit also requires specific processing means in order to generate and reproduce the audio signals. In contrast to this, the present invention provides a new solution that allows to form a stereo headphone in a much easier way.

According to a preferred embodiment of the present invention, the interface of the headset for receiving input data is adapted to wirelessly receive said data. In particular, said interface may be represented by a Bluetooth interface. Alternatively, other wireless technologies can be used such as e.g. DECT or a communication via infrared (IR).

As already mentioned above, two variations of the inventive concept are possible in order to form the stereo headphone. In a first embodiment, the additional speaker device comprises a single speaker which forms together with the speaker of the headset the stereo headphone. In this case, the speaker device could for example be represented by another headset. Alternatively, however, it would also be possible that said additional speaker device alone already forms a stereo headset. In this case, the speaker and microphone of the speaker is not used during this mode and might be put e.g. in an idle position. For this, the headset preferably comprises a necklace or a comparable element. Nevertheless, also in this second alternative the internal resources of the headset like the interface and the processing unit are still used in order to receive data and generate the stereo audio signals.

In a specific embodiment of the present invention, the additional speaker device and/or the headset comprises a microphone. Thus, the headset can in particular be used in connection with a mobile phone.

The headset of the present invention preferably comprises a volume adjustment button which is also used to adjust the volume of the stereo headphone when the speaker device is connected to said headset. Further, said volume adjustment button could additionally be used as a navigation element in order to navigate through a song/play list. In this way, the headset forms a remote control for a music player application. Said headset could further comprise a display which is used to show information on an actually played song in case the stereo headphone is used for listening music.

In accordance with the present invention, also a combination of a headset and an additional speaker device for use with a communication and/or multimedia device is proposed, wherein said headset comprises an interface for receiving input data, a processing unit for processing said input data to generate audio output signals, a speaker for outputting said audio output signals in a mono mode and connecting means for connecting said headset to a power supply in order to charge a battery or an accumulator being provided within said headset, wherein said speaker device is connectable to said headset via said connecting means and forms alone or together with the first speaker a stereo headphone and wherein the processing unit of said headphone processes said input data to generate stereo output signals when said speaker device is connected to said headset.

Finally, also a communication and/or multimedia device comprising a headset is proposed, wherein said headset comprises an interface for receiving input data, a processing unit for processing said input data to generate audio output signals, a speaker for outputting said audio output signals in a mono mode and connecting means for connecting said headset to a power supply in order to charge a battery or an accumulator being provided within said headset, wherein said connecting means are also connectable to a speaker device forming alone or together with said speaker a stereo headphone and wherein said processing unit processes said input data to generate stereo output signals automatically when said speaker device is connected to said headset.

Said communication and/or multimedia device is preferably a mobile phone, wherein according to a preferred embodiment of the present invention said device provides an audio player application which is automatically started when said speaker device is connected to said headset. In particular, said audio player application is an MP3 player.

BRIEF DESCRIPTION OF THE DRAWINGS

In the following, the invention will be explained in further detail with reference to the accompanying drawings.

DETAILED DESCRIPTION OF EMBODIMENT

Figure 1:
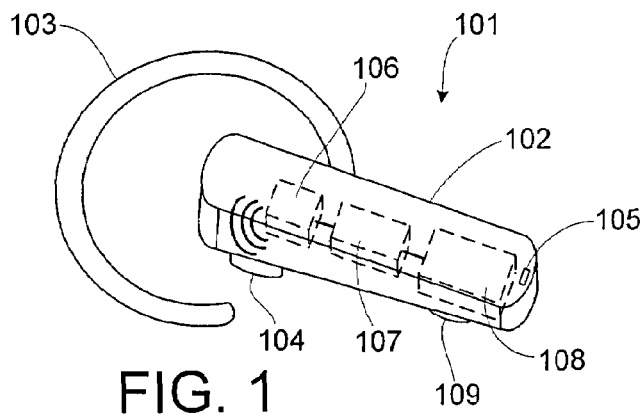
FIG. 1 shows a headset for use with a mobile phone which is known from the prior art.

The first embodiment of a headset 1 in accordance with the present invention shown in FIG. 2 again comprises a main body 2 with a mounting element 3 used to clamp the headset 1 to the ear of a user. On the rear part of the main body 2, a first speaker 4 is provided. Further, a microphone 5 is located at the front portion of the main body 2.

Similar to the headset shown in FIG. 1, also the headset 1 according to the present invention provides a processing unit 7 used to process data received via an interface 6 of the headset 1. Preferably, said interface 6 is provided for wireless communication and is in particular represented by a Bluetooth interface being able to communicate with a corresponding Bluetooth interface provided in a mobile phone 50. Said Bluetooth communication allows a direct communication between the headset 1 and the mobile phone 50 in order to exchange data. Alternatively, however, also other wireless communication interfaces could be used in order to exchange said data. E.g., also a data exchange via DECT or via infrared (IR) would be possible.

The data received by said interface 6 and processed by said processing unit 7 are then forwarded to the speaker 4 in order to reproduce audio signals. Furthermore, audio signals obtained via the microphone 5 are processed by said processor 7 and then transferred via said interface 6 to said mobile phone 50. In this way, a hands-free communication is obtained.

Figure 3:
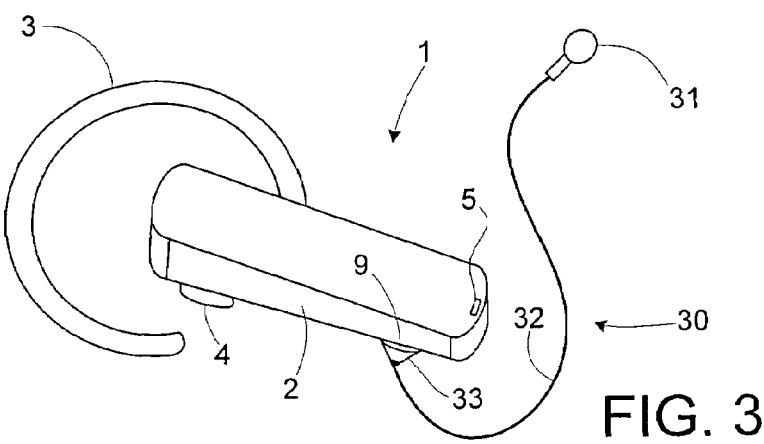
FIG. 3 shows a second embodiment of a headset of the present invention.

Although only shown in FIG. 3, said headset further comprises a volume select button 10 which is used in order to adjust the volume of the speaker 4. During telephone conversation, the user can easily increase or decrease the volume by actuating the button 10 in the desired way. Further, a small display 11 is located at the upper side of the main body 2 which display 11 shows the phone number of the other partner of the telephone conversation.

Finally, the headset 1 also has an internal power supply in the form of a battery or an accumulator 8. Said battery or accumulator 8 has to be charged from time to time and therefore a connector 9 is provided which allows the connection of said headset 1 to a docking station which is used to re-charge the battery 8.

The headset 1 as described so far is primarily used for telephone conversation. In this application, the output of the audio signals via said speaker 4 in a mono mode is sufficient in its quality. However, modern communication devices like mobile phones now also provide the possibility to use them as a music player, e.g. as an MP3 player. If this MP3 player application is selected, the quality of the mono signals would to poor. In this case, a stereo headphone would be preferred in order to be able to listen to music with high quality. In order to be still able to make use of the hands-free solution, the headset 1 shown in FIG. 2 now provides the possibility to connect an additional speaker device in the form of a stereo headphone to said headset 1.

Figure 2:
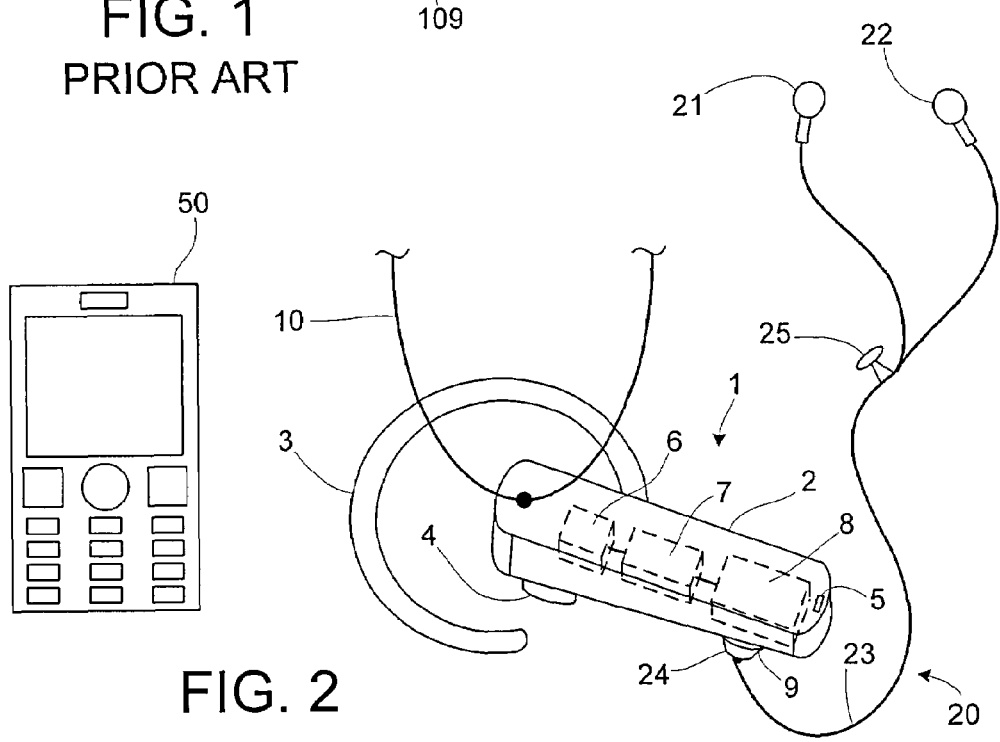
FIG. 2 shows a first embodiment of a headset in accordance with the present invention which is used in connection with a mobile phone.

As shown in FIG. 2, said additional speaker device 20 comprises two speakers 21 and 22 in order to form a stereo headphone. Both speakers 21, 22 are connected via a cable 23 and a connector 24 to the headset 1. In particular, the connector 24, which is preferably a normal 3.5 mm audio plug, can be directly connected with the connecting means 9 of the headset 1 which are usually used in order to connect the headset 1 to a docking station for re-charging the battery 8. Thus, additional connecting means are not required.

After this additional speaker device 20 has been connected to the headset 1, the audio data received via the interface 6 are automatically processed by said processing unit 7 in order to reproduce stereo data. These data are then forwarded to the speaker device 20 via the connecting means 9. Thus, the stereo headphone 20 can now be used in order to listen to music in a stereo quality while the resources of the headset 1 are still used in order to allow a hands-free use. Accordingly, the headphone 20 has not to be connected to the mobile phone 50.

As also shown in FIG. 2, said speaker device 20 may additionally comprise a further microphone 25 replacing the first microphone 5 of the headset 1 in case that the speaker device 20 is connected to the headset 1. Now, when a call is received or the user wants to make a call, he can choose between two options. At first, the user could disconnect the speaker device 20 with the microphone 25 and use the original headset 1 being placed on his ear. Alternatively, it would be possible to use the additional speaker device 20 together with the microphone 25 for a hands free communication. During the use of the stereo headphone 20, the headset 1, in particular the speaker 4, is of no further use and the headset 1 can therefore be placed in an idle position. For this, the headset 1 comprises a necklace 10.

There is further the additional option that in the case that the stereo headphone 20 together with its microphone 25 is used for making telephone conversation, the microphone 5 of the on-ear headset 1 is used as a second microphone in order to do noise cancelling to improve the voice quality. Further, when the additional stereo headset 20 with its microphone 25 is connected to the headset 1 and an incoming call is received, the speaker 4 of the on-ear headset 1 could be used to play the ringtone loud. Thus, the speaker 4 is now used as a ringer.

Accordingly, it is now possible for a user to connect an additional stereo headphone 20 to the headset 1 which still makes use of the internal resources of the headset 1 in order to allow a hands-free mode. Thus, a user can now in a very convenient way also listen to audio data in a high stereo quality.

According to a preferred embodiment, the headset 1 automatically recognises the connection of the stereo headphone 20 and transmits a corresponding information to the mobile phone 50. This information then causes the mobile phone 50 to automatically start the MP3 application. Thus, if a user connects the stereo headphone to the headset 1, he can immediately start to listen to music.

In case the hands-free stereo headset built in accordance with the present invention is used for listening music, the button 10 located at the upper surface of the main body 2 can again be used in order to increase or decrease the volume. Further, it would also be possible to use this button additionally in order to move forward or backward in a song/play list. This could for example be achieved by requiring the user to press the button for a specific time in order to activate a play list navigation mode. In this mode, the + or − options of the button 10 are used in order to move one song forward or backward. In this way, the headset 1 not only becomes a wireless link between the phone 50 and the stereo headphone 20 but also works as a remote control for the MP3 player application. As a further option, information on the actually played song could be shown on the display 11 of the headset.

FIG. 3 shows an alternative embodiment of the headset of the present invention. While in the first embodiment shown in FIG. 2 a complete additional stereo headphone is connected to the headset 1, in the second embodiment a speaker device 30 comprising only one additional speaker 31 is connected to the headset 1. Together with the first speaker 4 of the headset 1, now the additional speaker 31 of the speaker device 30 forms a stereo headphone. Again, said additional speaker device 30 is connected via a cable 32 and a connector 33 to the connecting means 9 of the headset 1.

Similar to the embodiment shown in FIG. 2, the processing unit 7 will automatically generate stereo audio signals in case the additional speaker device 30 is connected to the headset 1. Therefore, a user is again able to listen to high quality audio signals by connecting the additional accessory device to the headset 1. In the second embodiment shown in FIG. 3, the headset 1 permanently remains to the ear of the user since the first speaker 4 is also used for reproducing stereo audio signals. Thus, the second embodiment provides again a very convenient way in order to form a new stereo headphone.

As a further variation of the embodiment shown in FIG. 3, two headsets 1 could be interconnected by a cable comprising connectors at both ends in order to form one stereo headphone. In case this combination of two headsets is used to listening to music, a connecting cable of approximately 0.2 m length would be sufficient. However, it would then also be possible to use the two microphones of the headsets for stereo recording. If in this case a connecting cable of 1 to 3 m length is used, the two headsets could be placed on a table in order to pick up stereo effects which might be desired during e.g. a conference call. In this case were usually many participants sit in one room around a table and one person is calling into the meeting via telephone, this stereo functionally might be desired for providing a better feedback to the person at the other end of the communication link.

In summary, the present invention provides a new solution for forming a wireless stereo headphone or headset for use with a multimedia and/or communication device. A user is therefore now able to form a stereo headphone in a very fast and convenient way in order to listen to high quality audio signals.

The invention claimed is:
1. A headset for use with a communication and/or multimedia device, said headset comprising
 a) an interface for receiving input data,
 b) a processing unit for processing said input data to generate audio output signals, c) a speaker for outputting said audio output signals in a mono mode, and d) connecting means for connecting said headset to a power supply in order to charge a battery or an accumulator being provided within said headset, wherein said connecting means are also connectable to a speaker device forming alone or together with said speaker a stereo headphone and wherein said processing unit processes said input data to generate stereo output signals when said speaker device is connected to said headset.

2. The headset of claim 1, wherein said interface is adapted to wirelessly receive said input data.

3. The headset of claim 2, wherein said interface is a Bluetooth interface.

4. The headset of claim 1, wherein said speaker device comprises a single speaker which forms together with said speaker of said headset said stereo headphone.

5. The headset of claim 1, wherein said speaker device is a stereo headphone.

6. The headset of claim 1, wherein said headset comprises a microphone.

7. The headset of claim 6, wherein said speaker device comprises additionally a microphone.

8. The headset of claim 1, wherein said speaker device is represented by another headset.

9. The headset of claim 1, wherein said headset comprises a necklace to be worn by a user.

10. The headset of claim 1, wherein said headset comprises a volume adjustment button which is also used to adjust the volume of the stereo headphone when said speaker device is connected to said headset.

11. The headset of claim 10, wherein said volume adjustment button can be further used as a navigation element in order to navigate through a song/play list.

12. The headset of claim 1, wherein said headset comprises a display which is used to show information on an actually played song in case the stereo headphone is used for listening music.

13. A combination of a headset and an additional speaker device for use with a communication and/or multimedia device, said headset comprising a) an interface for receiving input data, b) a processing unit for processing said input data to generate audio output signals, c) a speaker for outputting said audio output signals in a mono mode, and d) connecting means for connecting said headset to a power supply in order to charge a battery or an accumulator being provided within said headset, said speaker device being connectable to said headset via said connecting means and forming alone or together with said speaker a stereo headphone, wherein said processing unit of said headphone processes said input data to generate stereo output signals when said speaker device is connected to said headset.

14. The combination of claim 13, wherein said interface is adapted to wirelessly receive said input data.

15. The combination of claim 14, wherein said interface is a Bluetooth interface.

16. The combination of claim 13, wherein said speaker device comprises a single speaker which forms together with said speaker of said headset said stereo headphone.

17. The combination of claim 13, wherein said speaker device is a stereo headphone.

18. The combination of claim 13, wherein said headset comprises a microphone.

19. The combination of claim 18, wherein said speaker device comprises additionally a microphone.

20. The combination of claim 13, wherein said speaker device is represented by another headset.

21. The combination of claim 13, wherein said headset comprises a necklace to be worn by a user.

22. The combination of claim 13, wherein said headset comprises a volume adjustment button which is also used to adjust the volume of the stereo headphone when said speaker device is connected to said headset.

23. The combination of claim 22, wherein said volume adjustment button can be further used as a navigation element in order to navigate through a song/play list.

24. The combination of claim 13, wherein said headset comprises a display which is used to show information on an actually played song in case the stereo headphone is used for listening music.

25. A communication and/or multimedia device comprising a headset, said headset comprising a) an interface for receiving input data, b) a processing unit for processing said input data to generate audio output signals, c) a speaker for outputting said audio output signals in a mono mode, and d) connecting means for connecting said headset to a power supply in order to charge a battery or an accumulator being provided within said headset, wherein said connecting means are also connectable to a speaker device forming alone or together with said speaker a stereo headphone and wherein said processing unit processes said input data to generate stereo output signals when said speaker device is connected to said headset.

26. The communication and/or multimedia device of claim 25, wherein said interface is adapted to wirelessly receive said input data from said communication and/or multimedia device.

27. The communication and/or multimedia device of claim 26, wherein said interface is a Bluetooth interface.

28. The communication and/or multimedia device of claim 25, wherein said communication and/or multimedia device is a phone.

29. The communication and/or multimedia device of claim 25, wherein said communication and/or multimedia device is a mobile phone.

30. The communication and/or multimedia device of claim 25, wherein said communication and/or multimedia device provides an audio player application which audio player application is automatically started when said speaker device is connected to said headset.

31. The communication and/or multimedia device of claim 30, wherein said audio player application is an MP3 player.

* * * * *